US006854337B1

(12) United States Patent
Tarara et al.

(10) Patent No.: US 6,854,337 B1
(45) Date of Patent: Feb. 15, 2005

(54) APPARATUS AND METHOD FOR MEASURING THE MASS OF VEGETATION OR FRUIT SUPPORTED ON A TRELLIS

(75) Inventors: Julie M. Tarara, Prosser, WA (US); John C. Ferguson, Grandview, WA (US); Francis J. Pierce, Prosser, WA (US); Marvin J. Pitts, Genesee, ID (US); Gary M. Hyde, Pullman, WA (US); Robert L. Wample, Clovis, CA (US); Andre L. Baritelle, Napa, CA (US)

(73) Assignees: The United States of America as represented by the Secretary of the Agriculture, Washington, DC (US); Washington State University Research Foundation, Pullman, WA (US)

( * ) Notice: Subject to any disclaimer, the term of this patent is extended or adjusted under 35 U.S.C. 154(b) by 0 days.

(21) Appl. No.: 10/635,978

(22) Filed: Aug. 7, 2003

Related U.S. Application Data

(60) Provisional application No. 60/407,429, filed on Aug. 30, 2002.

(51) Int. Cl.[7] .................................................. G01N 3/08
(52) U.S. Cl. ........................................................ 73/826
(58) Field of Search ............................... 73/152.59, 784, 73/862.472, 862.451, 826; 256/35; 140/123.5; 47/42, 58.1 FV; 211/119.01, 85.23

(56) References Cited

U.S. PATENT DOCUMENTS

RE31,023 E    9/1982  Hall, III

| 4,381,838 | A | * | 5/1983 | Boogaart ................. 211/85.23 |
| 4,436,284 | A | * | 3/1984 | Varela-Hernandez ......... 256/35 |
| 5,216,922 | A | * | 6/1993 | Gustafson et al. ............ 73/784 |
| 5,249,472 | A | * | 10/1993 | Brown .................. 73/862.472 |
| 5,272,834 | A | * | 12/1993 | Jarahian ........................ 47/46 |
| 6,021,601 | A | * | 2/2000 | Weathers et al. .............. 47/42 |
| 6,374,538 | B1 |  | 4/2002 | Morris et al. |
| 6,525,276 | B1 |  | 2/2003 | Vellidus et al. |
| 6,578,318 | B1 | * | 6/2003 | Clark .................... 47/58.1 FV |

OTHER PUBLICATIONS

Young, G.S., "Wire Tension and Post Land Measuring Instruments," *Agricultural Engineering Australia* (1983) 12(2):10–16.

Young, G.S. and Jerie, P.H., "Structural Investigation of the Tatura Trellis," *Transactions of the ASAE*, (1985) 28:75–78, 82.

* cited by examiner

*Primary Examiner*—Edward Lefkowitz
*Assistant Examiner*—Octavia Davis
(74) *Attorney, Agent, or Firm*—David R. Nicholson; John D. Fado; Lesley Shaw

(57) ABSTRACT

The present disclosure concerns apparatus and methods useful in estimating crop yields of plants that are supported on a trellis. According to one aspect, a method for measuring the mass of trellised plant structures includes measuring the tension of a support wire of the trellis structure on which the plant structures are supported, such as with a load cell placed in-line with the support wire. The tension of the support wire is converted into the mass of new plant growth supported on the support wire, using, for example, an empirically derived algorithm specific to the trellis structure.

20 Claims, 12 Drawing Sheets

APPARATUS AND METHOD FOR MEASURING THE MASS OF VEGETATION OR FRUIT SUPPORTED ON A TRELLIS

CROSS-REFERENCE TO RELATED APPLICATIONS

This application claims the benefit of U.S. Provisional Application No. 60/407,429 filed Aug. 30, 2002. The disclosure of said provisional application is incorporated herein by reference in its entirety.

BACKGROUND OF THE INVENTION

The present invention relates generally to apparatus and methods for measuring vegetative mass and the mass of fruit on plants such as, but not limited to, grapevines, greenhouse tomatoes, and cane berries, which are typically supported on a trellis structure.

Worldwide, grapes are the most widely-planted fruit crop, and rank third in overall tonnage produced. Grapes, particularly those which are destined for juice or wine, are quite perishable once picked. Hence, processing cannot be delayed and must generally be accomplished immediately after harvest.

Crop yield varies from year to year, a fact that can have a significant bearing on processing because of the need for harvesting equipment, farm laborers, and other infrastructure. Hence, juice processors and wineries need the ability to forecast yield as accurately as possible in order to arrange for efficient harvesting, processing, fermentation, and storage.

Moreover, grape and fruit quality are also affected by overall yield, and optimum quality can be achieved by thinning a crop at some point prior to its harvest. It is therefore advantageous to be able to predict yield well in advance of harvest in order to permit thinning.

The current method of estimating yield in grapevines is labor-intensive and is not particularly accurate. The standard technique currently in use essentially involves collecting fruit samples by hand from particular plants in the field and comparing these samples to past years' data. This hand sampling is highly labor-intensive. From indicator vines sampled annually or from randomly selected vines, the average number of clusters per grape vine is determined; and after fruit set, the average number of berries per cluster is calculated. Once or twice thereafter, either whole fruit cluster or individual berry samples are collected and the average weight per cluster or berry is computed. These weights are compared with those from previous years that are considered to be biologically and meteorologically similar to the current season. Final berry or cluster weight, which is translated into "yield," is projected using a ratio of the current sample weight to a comparison year's weight at that sampling date. Unless samples are collected more frequently, the grower does not have an indication of the dynamics of berry growth, which change with variety and season at a given site.

There are guidelines for establishing adequate sample sizes, but the cost and time involved in hand sampling impose practical limits on the size of the dataset. Self-reporting suggests that industry-wide, the accuracy of estimating final yield is 10%, with larger, older operations achieving the best results in large part due to extensive historical databases of cluster and berry weights.

Savings in time and labor could be realized if inexpensive equipment were developed to automate crop estimation within the accuracy of the current method. Moreover, yield estimates and decisions about crop thinning could be improved through the use of continuous data collection on crop mass during fruit development.

Hence, a need exists for new automated systems for weighing trellised crops and/or estimating crop yields of trellised crops, such as grapevines.

One manner of automating this process is to take advantage of the fact that as plants on trellises grow, the load which is borne by the trellis increases. More particularly, increasing plant mass which is supported by a trellis' horizontal support wire operates to increase the tension in the wire itself, some of which tension is transferred to the trellis posts. Loads on posts in orchards have in fact been measured for the purpose of designing sufficiently robust trellises, but measurements of wire tension in trellises have not been previously utilized for estimating crop yield.

SUMMARY OF THE INVENTION

The present disclosure is directed to an apparatus and methods useful in estimating crop yields of plants that are supported on a trellis structure.

According to one aspect of the invention, methods and apparatus are provided for measuring the mass of trellised plant structures, and one embodiment of such a method and apparatus includes measuring the tension of the horizontal support wire of the trellis structure on which the plant structures are supported. This is accomplished, for example, by using a load cell which is placed in-line with the support wire.

An increase in the tension of the support wire, caused by new plant growth, is converted into a corresponding mass measurement, using, for example, an empirically derived algorithm specific to the trellis structure.

In one specific approach, such an algorithm is developed by placing objects of known mass on the support wire and measuring the tension of the wire with the load cell or other tension-measuring device. Additional mass is then incrementally added to the horizontal wire, and wire tension is measured after each increment.

Using regression analysis, a regression equation is generated for relating wire tension to mass supported by the support wire.

In particular embodiments, the measurement of the tension of the support wire is corrected to account for thermal expansion and contraction of the wire (experienced in a natural environment) by converting the tension measured at the load cell into a corrected value using an empirically derived algorithm specific to the trellis structure. The corrected value for wire tension can then be used to determine the mass of new plant growth that has occurred since a previous determination.

The total mass of new plant growth typically includes vegetation (e.g., leaves and shoots) and a harvestable crop (e.g., fruit). To determine the total mass of the crop supported on the trellis wire, the total mass of plant growth is multiplied by the mass fraction of the harvestable crop (i.e., the proportion of the mass of the crop to the total mass of plant structures). The mass fraction of the crop can be determined, for example, by destructive sampling of selected plant structures supported on the trellis structure or proportional estimates of crop increases from appropriate growth models.

According to another aspect of the invention, methods are provided for predicting crop yield at harvest from the tension of the trellis' support wire. In one embodiment, a location-specific and variety-specific database of wire tension and crop yield is developed over several growing seasons.

Once such a database is established for a particular field or vineyard, crop yield at harvest can be predicted by measuring wire tension and selecting from the database a previous season that is considered to be biologically and/or meteorologically similar to the current season. Crop yield is then projected by comparing the measured wire tension of the current season to the ratio of wire tension measured on the same date from the previous season to crop yield from the previous season.

The foregoing and other features and advantages of the invention will become more apparent from the following detailed description of several embodiments, which proceeds with reference to the accompanying figures.

The following is a list of parts and features, along with nomenclature:

a. Trellis structure, 10
b. Grapevines, 12
c. End posts, 14
d. Intermediate support posts, 18
e. Trellis support wire, 20
f. Load cell, 22
g. Semi-rigid trunk of grape plant, 24
h. Horizontal cordons of grape plant, 26
i. Shoots of grape plant, 28
j. Leaves, 30
k. Grape or fruit clusters, 32
l. Mechanical connector or hook, 34
m. Coupling wire, 36
n. Turnbuckle, 38
o. Pulley, 40
p. General purpose (desktop or laptop) computer, 42
q. Connecting wire, 44
r. Anchor wire, 46

DEFINITIONS

Unless defined otherwise, all technical and scientific terms used herein have the meaning commonly understood by a person skilled in the art to which this invention belongs.

DETAILED DESCRIPTION OF THE INVENTION

Grapevines in their native environment grow prolifically but are not freestanding like trees and shrubs; rather, vines use trees as supports for their semi-rigid trunks, growing to the top of the tree canopy to expose their fruit clusters to sunlight. In order to simulate these natural conditions, grape growers provide a trellis support structure for the semi-rigid vine trunk. Trellis designs vary but most such structures share certain common features such as evenly spaced support posts and at least one support wire which is strung from post to post. Using trellises, grapevines are highly manipulated to reduce vegetative growth, increase fruit production, and maintain the vine in a form that is amenable to agricultural management (i.e., in rows and under 2 m tall).

Figure 1:
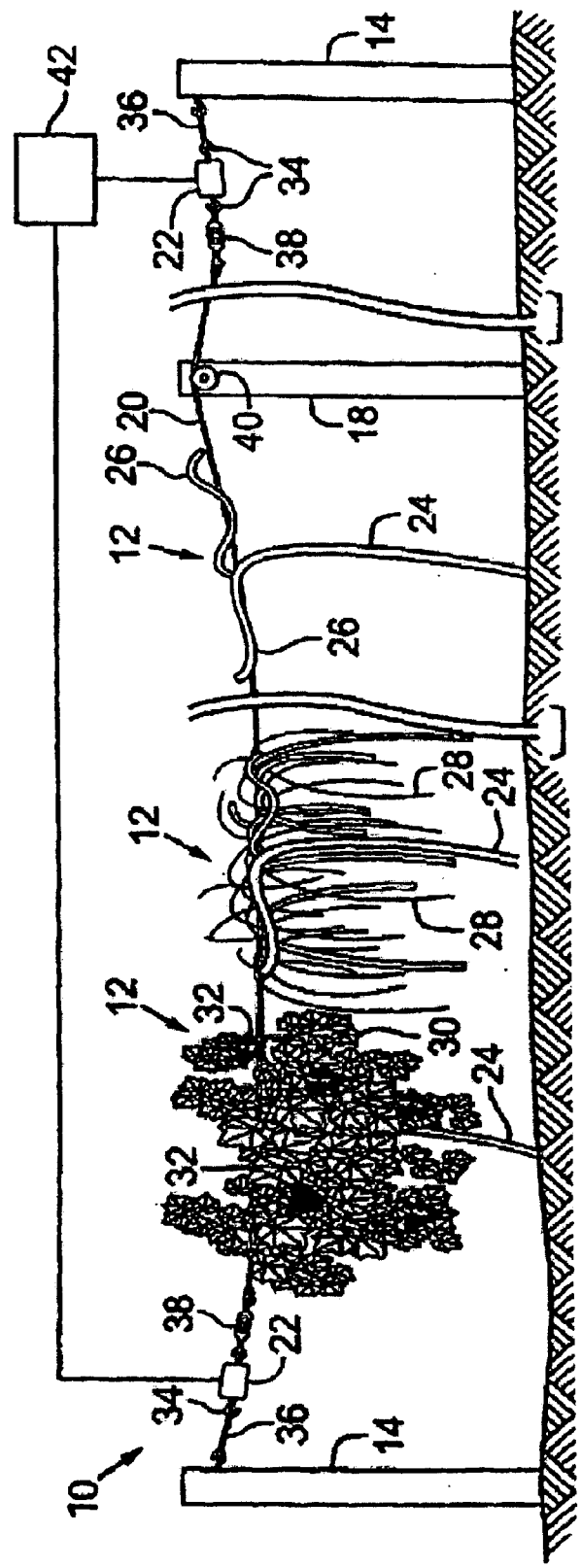
FIG. 1 is a schematic view of a trellis structure shown supporting a plurality of grapevines, with first and second load cells positioned in-line with the horizontal support wire, proximate to the end posts of the trellis structure for measuring the tension in the horizontal support wire.

Referring to FIG. 1, there is shown an embodiment of a trellis structure 10 supporting a plurality of grapevines 12.

The trellis structure 10 includes end posts 14 and one or more intermediate posts 18 (one of which is shown in FIG. 1) spaced desirably evenly between the end posts 14.

Most existing trellis structures typically include intermediate and end support posts which are made from wood and which have a tendency to deflect under the weight of the grapevines 12. Thus, if retrofitting an existing trellis structure, such wooden posts may be replaced with metal support posts, anchored in the ground, such as with concrete, to minimize or prevent deflection of the posts.

For illustrative purposes, the grapevines 12 are shown in various stages of growth. A grapevine 12 generally consists of a semi-rigid trunk 24, generally horizontal cordons 26 extending from the trunk 24 and partially supported by the trellis wire 20, shoots 28 sprouting from the cordons 26, and leaves 30 and fruit, or grape, clusters 32 sprouting from the shoots 28. Although the following description proceeds with reference to grapevines, the apparatus and methods described herein can also be applied to any of various other trellised crops, such as, without limitation, trellised vines, cane-berries (e.g., raspberries and blackberries), kiwifruit, tomatoes, cucumbers, trellised tree fruits (e.g., apples, cherries, and peaches), and trellised hops.

The trellis structure 10 also includes at least one support wire 20 (commonly known as a "cordon wire" when used to support grapevines) extending between the end posts 14 for supporting the grapevines 12. The support wire 20 can comprise a galvanized steel wire of a size ranging from 9-gauge to 12-gauge.

Alternatively, the support wire 20 can be made of any other suitable type of wire or cable. The support posts (i.e., the end posts 14 and the intermediate posts 18) desirably are made of a rigid material (e.g., steel pipe) and are sufficiently anchored into the ground to minimize deflection or bending of the support posts under the weight of the grapevines 12 supported on the support wire 20.

Figure 3:
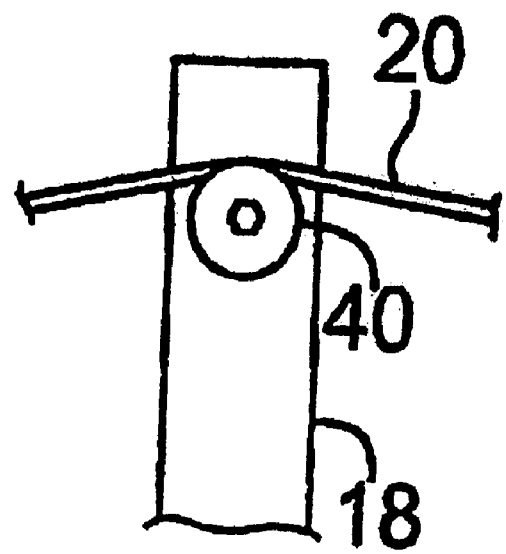
FIG. 3 is an enlarged view of the top portion of an intermediate post of the trellis structure of FIG. 1, showing a pulley mounted to the intermediate post for supporting the horizontal trellis wire.

As best shown in FIG. 3, each intermediate post 18 desirably includes a pulley 40 on which the support wire 20 is supported. The pulley 40 serves to facilitate the transfer of tension equally to both sides of the intermediate post 18. In most conventional trellis structures, the horizontal support wire is attached to the intermediate posts with staples or other types of fasteners, which inhibit the transfer of tension. Thus, if retrofitting an existing trellis structure, the staples or other fasteners used to attach the support wire to the intermediate posts should be replaced with pulleys 40 or equivalent devices.

Most of the load due to the vegetative mass of the grapevines 12 (i.e., the shoots 28 and the leaves 30) and the mass of the fruit clusters 32 is supported by the horizontal support wire 20 so that, as these plant structures grow, the tension in the support wire 20 increases. Accordingly, the measured tension of the support wire 20 can be used to determine the mass of new plant growth that occurs over a particular period of time by correlating wire tension to supported on the support wire 20.

One or more tension-measuring devices, such as the illustrated load cells 22, are placed in-line with the support wire 20 for measuring the tension in the support wire 20. In the illustrated embodiment, for example, a load cell 22 is positioned adjacent each end post 14. If desired, additional load cells 22 may be placed between adjacent pairs of intermediate posts 18.

Tension-measuring devices other than load cells, such as strain gauges, also may be used for measuring the tension of the support wire. Alternatively, the support wire 20 itself may be used as a strain gauge for measuring tension by conducting an electric current through the wire and measuring the change in resistance between the ends of the wire as a function of load on the wire.

The load cells 22 desirably are operatively connected to suitable data-processing and data-storage equipment, such as a general purpose computer, indicated at 42, for receiving, storing, and/or processing data from the load cells 22. In particular embodiments, the computer 42 is configured to receive data from the load cells 22 corresponding to wire tension and automatically calculate the mass of plant structures supported on the support wire 20 and estimate the crop yield of the grapevines 12 at harvest based on the data received from the load cells 22. Specific algorithms for calculating the mass of plant structures supported on the horizontal trellis support wire 20 and estimating crop yields are described below.

Figure 2:
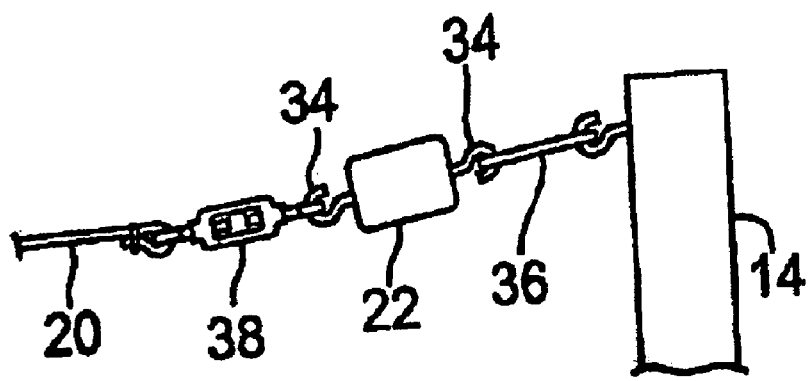
FIG. 2 is an enlarged view of one of the load cells and an adjacent end post of the trellis structure of FIG. 1, showing the load cell coupled at one end to the horizontal support wire via a turnbuckle and at another end to the top portion of the end post.

As best shown in FIG. 2, each load cell 22 has suitable mechanical connectors, such as the illustrated hooks 34, one of which is coupled to a respective end post 14 via a wire 36 and the other of which is coupled to the support wire 20 via a turnbuckle 38 or equivalent device for adjusting the tension in the support wire 20. The hooks 34 in the illustrated configuration are threadably received in corresponding tap holes in the respective load cells 22 to allow for further adjustment of wire tension.

To determine the relationship between the mass supported by the support wire 20 and wire tension measured at each load cell 22, each load cell 22 of the trellised structure 10 is calibrated before the growing season. To calibrate the load cells 22, the initial tension of the support wire 20 is set to a nominal value within the operating range of the load cells 22 using the turnbuckles 18. After the initial tension is set, weights of known mass are hung at selected locations along the length of the support wire 20, and the tension at each load cell 22 is measured.

Additional weights are incrementally added to the support wire 20, and the tension of the support wire 20 at each load cell 22 is measured after each incremental increase in weight. The weights are then incrementally removed from the support wire 20, and the tension of the support wire 20 at each load cell 22 is measured after each incremental decrease in weight.

For each load cell 22, linear regression (e.g., method of least squares) can be used to generate a linear-regression line and corresponding regression equation:

$$T_M = m \cdot M + T_I, \quad \text{(Equation 1)}$$

where $T_M$ is the measured tension, $T_I$ is the initial tension, M is the mass supported by the support wire 20 and m is the slope of the regression line. Solving for the mass M yields:

$$M = (T_M - T_I)/m. \quad \text{(Equation 2)}$$

Equation 2 can be re-written as $$M = (T_M - T_I) \cdot C_C, \quad \text{(Equation 3)}$$

where CC, termed the "calibration coefficient" of the load cell 22, is a constant equal to 1/m. Using equation 3, the mass of new plant growth can be determined at any time during the growing season by measuring the wire tension $T_M$ at either load cell 22.

The sensitivity of a load cell 22 is a function of the distance such load cell is from the mass being supported by the cordon wire—sensitivity decreases with distance. Accordingly, in addition to placing a load cell near each end post 14 (such as shown in FIG. 1), it is desirable to use a load cell 22 or other tension measuring device between each pair of adjacent intermediate posts 18. In this manner, each load cell 22 can be used to measure the mass of new plant growth that occurs to either side of the load cell 22. To maximize the response of the load cells 22, each load cell desirably is placed at the mid-point of the length of the support wire 20 extending between each pair of adjacent support posts.

Figure 4:
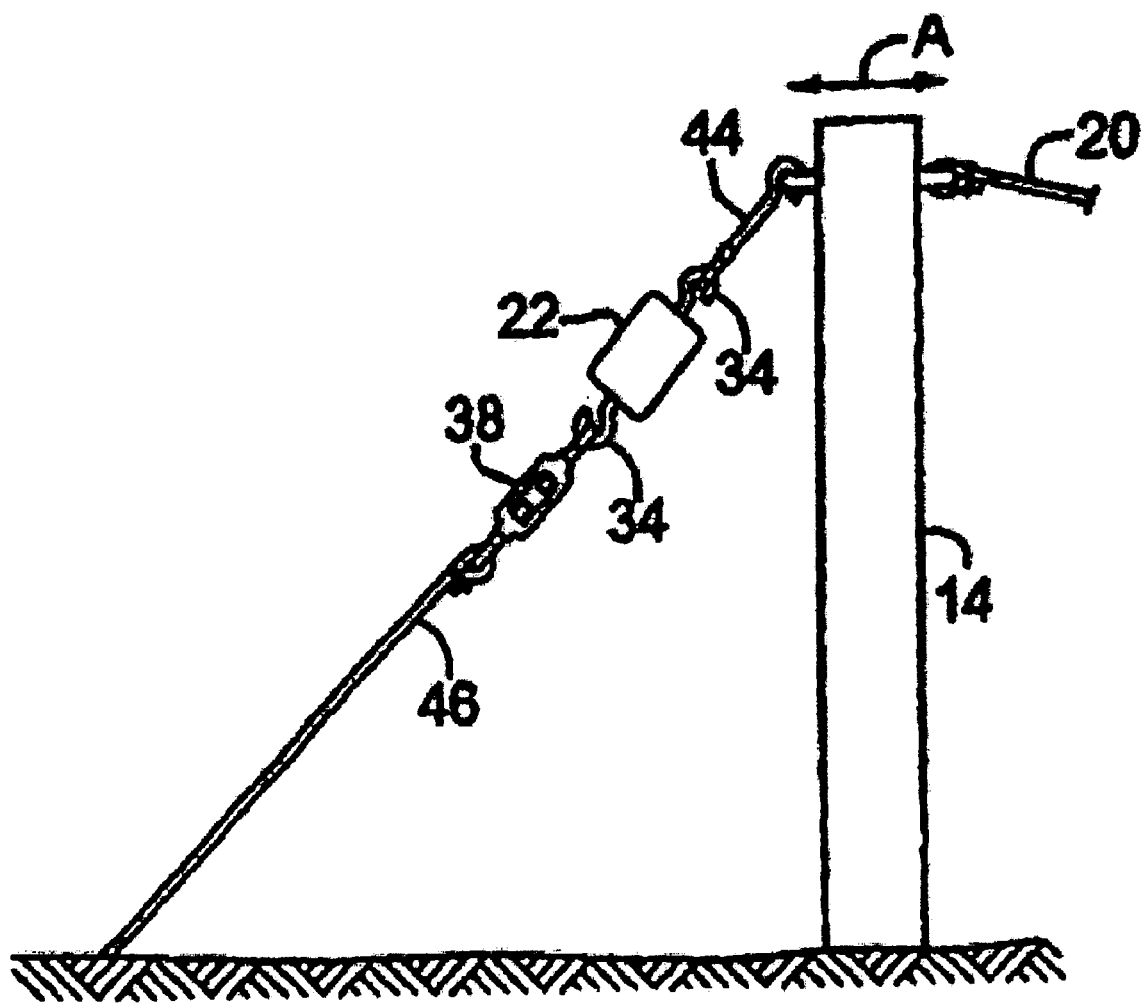
FIG. 4 is a schematic view showing an alternative approach for connecting a load cell to a trellis structure.

Referring to FIG. 4, there is shown an alternative approach for measuring a load supported on a trellis structure using a tension-measuring device. In the embodiment of FIG. 4, a load cell 22 is coupled at one end to the top portion of an end post 14 via a connecting wire 44. The other end of the load cell 22 is connected to a turnbuckle 38, which in turn is connected to an anchor wire 46. The bottom end of the anchor wire 46 is fixed to the ground using a suitable anchor (not shown). The end post 14 in this embodiment is an existing support post, such as a wooden post, anchored to the ground such that loading or unloading the support wire 20 causes deflection of the top portion of the end post 14, as indicated by double-headed arrow A.

Since the load cell 22 in the embodiment of FIG. 4 is not placed in-line with the support wire 20 itself, this manner of using the load cell 22 has particular applicability to trellis structures having more than one support wire. Such trellis structures include, without limitation, a Y-shaped trellis, such as used for trees, a VSP (vertical shoot positioning) system, or other multiple-wire trellises.

Figure 5:
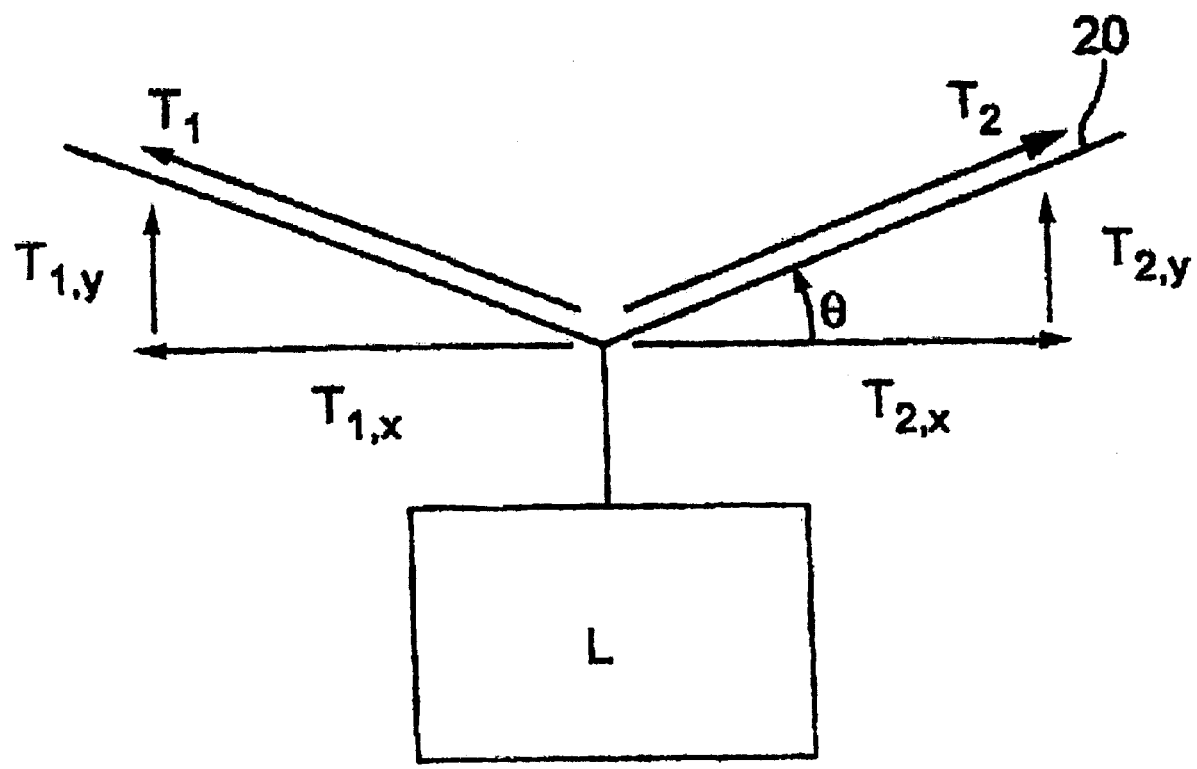
FIG. 5 is a free-body diagram illustrating the forces acting on a length of support wire of a trellis structure.

In alternative embodiments, a load cell can be placed in-line with each of the main support wires of a vertically divided trellis (e.g., a Scott Henry or Smart-Dyson trellis) or a horizontally divided trellis (commonly known as a "double curtain" trellis). Referring to FIG. 5, there is a shown a free body diagram illustrating the forces acting on a length of the support wire 20. L represents the load distributed along the length of the wire 20. Ideally, the vertical component of the tension, Ty, is equal on either side of the load ($T_{1,y}=T_{2,y}$) so that:

$$T_y = L/2. \quad \text{(Equation 4)}$$

Also, Ty is a function of the angle $\theta$ between the wire and the horizontal:

$$T_y = T(\sin \theta), \quad \text{(Equation 5)}$$

where T is the total tensile force on the wire. By substitution, $$T = L/(2 \cdot \sin \theta). \quad \text{(Equation 6)}$$

Since the tension T increases with corresponding decreases in $\theta$ the change in tension ($\Delta T$) (from an initial tension to a final tension) per unit change in the load L (by adding or removing weight from the wire) increases as the initial tension of the wire increases. Thus, the higher the initial tension of wire 20, the greater the measured response of the load cells 22.

Due to the coefficient of thermal expansion of the support wire 20, the support wire 20 will stretch and contract as the temperature of the support wire 20 increases and decreases, respectively, thereby varying the tension measured at the load cells 22. To correct for changes in length caused by temperature variations, an empirically derived temperature-coefficient, CT, is used to convert a raw measurement of wire tension from a load cell 22 to a temperature-corrected value for tension.

The temperature-coefficient, CT, for the support wire 20 is determined by measuring the temperature and tension of the support wire 20 over a calibration period (e.g., 48 hours), during which plant growth is assumed to be negligible. The temperature-coefficient, CT, is the slope of the regression line generated from the temperature and tension data collected over the calibration period.

The following equation is used to convert a raw measurement of wire tension from a load cell 22 to a temperature-corrected value:

$$T_C = T_M + [(20° C. - Temp_W) \cdot (C_T)], \quad \text{(Equation 7)}$$

where $T_C$ is the temperature-corrected value for wire tension, TM is the measured value for wire tension at a load cell 22, and $Temp_W$ is the current temperature of the wire in ° C.

An equation for translating the temperature-corrected value $T_C$ into a value corresponding to the mass of new plant growth on the support wire 20 is obtained by substituting $T_C$ for $T_M$ in equation 3 above:

$$M = (T_C - T_1) \cdot C_C. \quad \text{(Equation 8)}$$

Any suitable temperature-measuring device can be used to measure the temperature of the support wire 20. In a working embodiment, for example, one or more thermocouples are attached using a suitable adhesive to the underside of the support wire 20.

In an alternative approach for correcting the tension measured at a load cell to account for thermal expansion and contraction, ambient air temperature is used instead of wire temperature to calculate the temperature coefficient and to convert a raw measurement of wire tension to a temperature-corrected value.

To minimize the effects of wind on tension measurements, the tension at a load cell 22 should be measured several times over an averaging period. The average tension is then used to determine the mass of new plant growth (Equation 3 or 8). In one specific approach, for example, tension is measured every five seconds over an averaging period of at least fifteen minutes.

If the fraction of fresh mass due to the growth of the fruit 32 is known, then the mass of the harvestable crop (i.e., the grape clusters 32) at any time during the growing season can be determined using the equation:

$$M_{fruit} = (T_C - T_1) C_C R_{F/P}, \quad \text{(Equation 9)}$$

where $M_{fruit}$ is the total estimated mass of fruit, and $R_{F/P}$ is the ratio of mass due to fruit to the overall mass of new plant growth (i.e., the mass due to fruit and vegetation) at that particular time during the growing season. The ratio $R_{F/P}$ typically varies from 0.0 before fruit set to as high as 0.8 at harvest.

The ratio $R_{F/P}$, for example, can be determined by destructive sampling. This involves physically removing and separating the vegetation and fruit from at least one grapevine 12 and then weighing the vegetation and fruit to calculate a ratio $R_{F/P}$ representative of all the grapevines 12 supported by the trellis structure 10.

Over several growing seasons, a field or vineyard-specific and variety-specific database of wire tension measured over the course of each season and crop yield for each season can be developed. Once such a database is established for a particular field or vineyard, then crop yield at harvest can be predicted by measuring wire tension and selecting from the database a previous season that is considered to be biologically and meteorologically similar to the current season. Crop yield can then be projected, for example, by comparing the measured wire tension of the current season to the ratio of wire tension measured on the same date from the previous season to the crop yield from the previous season.

EXAMPLE, MATERIALS, AND METHODS

The following examples are intended only to further illustrate the invention. These examples specifically are not intended to limit the scope of the invention which is defined by the claims.

The objectives of these examples and experiments were to: 1) quantify the relationship between tension in the cordon wire of a grapevine trellis, and crop mass; 2) account for the influences of temperature and wind speed on wire tension; 3) determine whether the relationship between tension and mass changes during the growing season; 4) estimate the sensitivity of the load cell to crop load as a function of the distance between the load and the load cell; and 5) determine if the contribution to wire tension due to fruit mass can be extracted from the total tension which is a sum of fruit and vegetative masses.

Materials and Methods

A 0.34-ha. vineyard (*Vitis labrusca* L. cv. Concord) near Prosser, Wash. (46.30° N, 119.75° W) was used for the experiment. Of the 11 vineyard rows, 9 were used for experimental treatments with the outermost left as buffers. Planted in 1981, the vines had been grown with a single trunk trained to a bilateral cordon at about a 1.7 m height and were spur-pruned annually. There were 2.4 m between vines and 3.0 m between rows oriented north-south. The trellis consisted of wood posts (12 cm diam., 3.0 m long, 1.7 m above ground) at 7.3-m intervals along the row. A single wire (2.9 mm diam.; 9 AWG [American Wire Gauge], galvanized) strung from post to post at cordon height supported the vines (FIG. 1). Some of the cordons had grown around the wire.

The trellis was retrofitted to maximize the transfer of tension along the cordon wire to a load cell near the end post. Wood end posts, which can shift in soil, were replaced with 3.2-m long steel pipe (11.4 cm o.d., 10.8 cm i.d.). The pipe was placed in a 0.9-m deep, 0.3-m diameter post-hole and then driven about 0.6 m into the undisturbed soil below. Concrete was used to fill the hole. A short cantilever was welded atop the post and an aluminum benchmark plate was cemented to the ground directly below so that any shift in the post's position could be detected with a plumb line. Staples that stabilized the cordon wire atop intermediate posts were removed and replaced with pulleys free to rotate at about 1.7 m on the side of the post (FIG. 3). Existing splices in the cordon wire were clamped and painted to provide a visual indicator of slipping.

A load cell (RSC-3K-25100, HBM Inc., Marlboro, Mass.) was placed in-line with the cordon wire between the wire end and an eyebolt about 10 cm below the top of the end post (FIG. 1, 2). The eyebolt was used to fine tune initial tension, which was set manually soon after budbreak (Day of Year [DOY] 117). Because the tension was not uniformly transmitted from one end of the row to the other, the initial tension at the north end of all rows was set to about 1000 N, and at the south end to about 500 N. Unequal tension was partly due to the introduction of static force on the wire by the growth of some cordons around it, and by friction in the pulleys (FIG. 3) at the intermediate posts.

The load cells' output voltage was scaled and offset to produce a 0 to 2.5-V linear output for a 0 to 1800N range of force. A five-point calibration was done using a total of 180 kg of dead weight. Previous work in this vineyard suggested that the tension on the cordon wire would not exceed 1500 N. The temperature of the cordon wire was measured with three thermocouples wired in parallel (Type T), glued to the underside of the wire at each end of the center row. Signals from the load cells and thermocouples were scanned every 5 s and averaged every 15 min by a datalogger and multiplexer (CR-10X and AM416, Campbell Scientific, Logan, Utah). Measurements were recorded between DOY 120 and DOY 305 (leaf fall). Wind speed at 2 m was measured by 3-cup anemometer (Wind Sentry, R. M. Young, Traverse City, Mich.) at the Public Agriculture Weather System station located about 700 m the vineyard.

One of three levels of crop load, or potential yield, was imposed over an entire row in a randomized complete block with blocks consisting of 3 rows of equal length (85, 95 or 107 m). On DOY 182, vines had either all fruit removed (no crop [NC]), alternate clusters removed (half crop [HC]), or no clusters removed (full crop [FC]). At thinning, berries were just beyond "pea size," a recognized viticultural stage that is defined by the average size of the berries on the cluster. The NC rows served as indicators of the fraction of wire tension due to vegetation.

The fresh mass of reproductive (fruit) and annual vegetative tissues (green shoots and leaves) was estimated five times during the growing season that corresponded to the grape industry's sampling dates or key phenological stages. Shoots, leaves, and fruit were stripped from one vine per row, separated, and immediately weighed to the nearest 0.1 g. Vines were selected from the middle of each row to minimize the effect of removing mass on the tension at the load cell. The size of the vineyard and the perennial nature of the crop precluded more extensive destructive sampling.

On the same days that fresh mass was recorded, known mass was hung from the cordons to evaluate the system's response to loading and to indicate any shift in the sensitivity of the system over time. Three 3.8 kg weights were hung incrementally at each vine to simulate crop loads of 1.5 to 4.6 kg m$^{-1}$ of row (5 to 15 T ha$^{-1}$). Each vine in a row received one weight before the next was hung. The system was allowed to equilibrate for 5 min between each weight set.

From DOY 182 until harvest, irrigation was controlled to maintain soil water in the root zone between 10 and 15% by volume to minimize shoot growth during the period of fruit growth (deficit irrigation). Fruit was picked by hand in three partial harvests on DOY 261, 264, and 267, removing all fruit from every third vine on each day. Fruit mass per vine, average mass per cluster, and average mass per berry were recorded.

When installed in a trellis, the wire (typically a low-grade galvanized steel) stretches and contracts at a rate different from that predicted by its nominal coefficient of thermal expansion as the wire is now part of a system connected to physical and biological elements. A correction for thermal expansion was developed empirically. A 48-h moving average was applied to the temperature-corrected data, with a minimum of 96 observations required for an estimate to be made. Wire tension was regressed on wire temperature (° C.) for the 48 h preceding each of the 5 dates at which known mass had been hung from the trellis, and at harvest, when the final fruit mass was measured. This was done for each row end under the assumption that there was negligible increase in fruit mass during that 48 h period. Each trellised row and row end would be expected to have its own temperature coefficient because of inherent variability in the wires, vines, and attachment points. Slopes from the sample dates were compared within each row end using a test for heterogeneity of slope. Using the slopes from these regression equations, raw tension data within each end row (n=192) were corrected to a standard temperature of 20° C. using the following equation:

$$\text{Tension}_{corrected} = (\text{Tension}_{corrected}) + [(20° \text{ C.} - \text{Temperature}_{wire, current})(\text{slope})]$$

Results and Discussion

Figure 6:
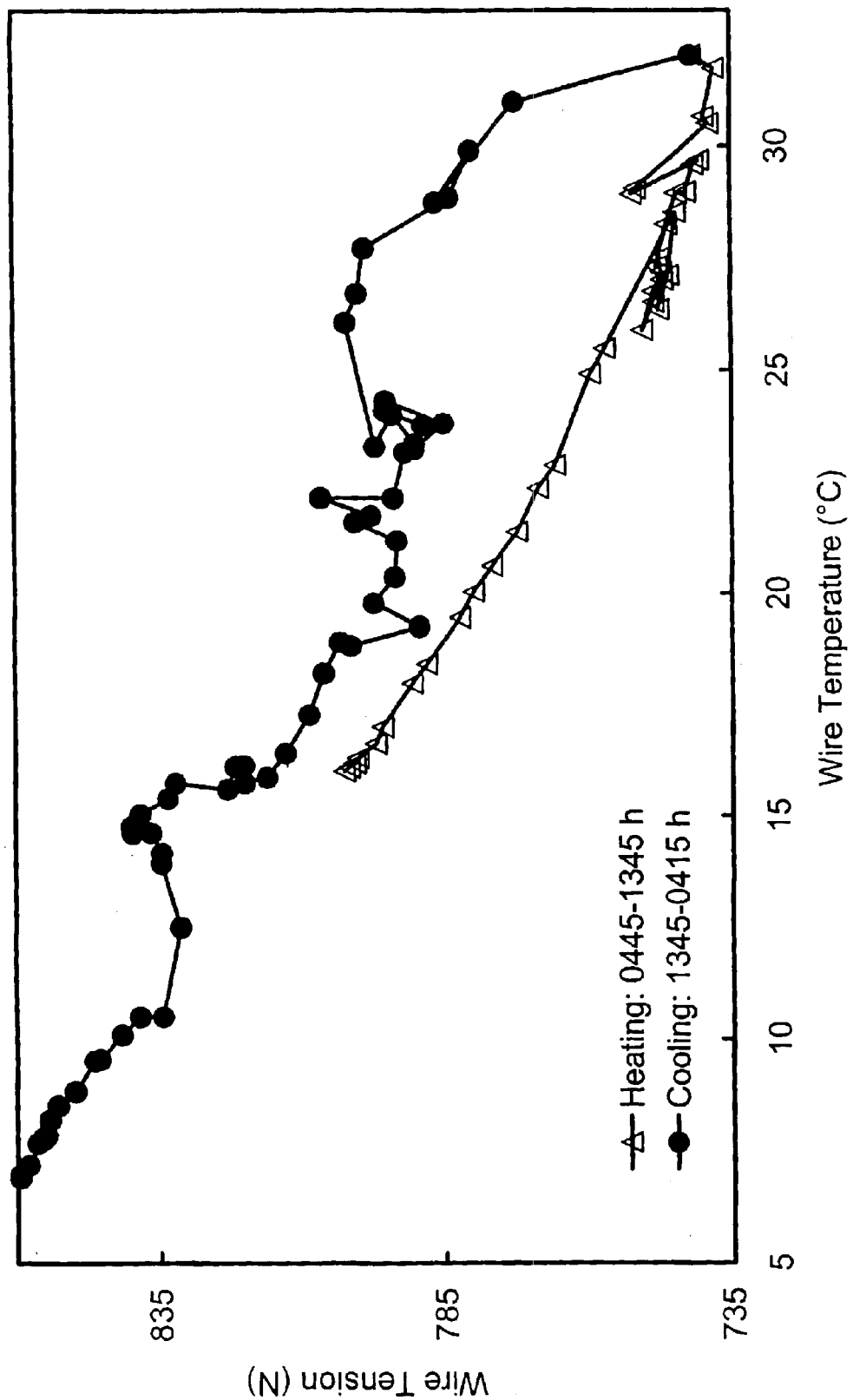
FIG. 6 is a chart showing the relationship between wire tension and wire temperature over an early-season diurnal heating-cooling cycle. The cycle shown demonstrates the pronounced hysteresis that can occur when foliage does not shade the wire.

Correction for Wire Temperature. As expected, temperature affected tension in the cordon wire. Early in the season, while the wire is fully exposed to solar radiation, heating and cooling patterns differed, suggesting that the wire did not stretch or contract uniformly (FIG. 6). It is possible that the cordon wire contracts in "bursts" that correspond to the dynamic tension (i.e., contracting by cooling) overcoming static forces that are imposed by attachment points like pulley friction and the growth of cordons around the wires. By midseason, when the canopy fully shaded the wire, diurnal hysteresis was much less perceptible (data not shown). While this hysteresis might be a concern for short-term estimations (within 24-h), it is insignificant within the context of seasonal yield prediction and the use of 48-h smoothing for the temperature-corrected estimates of tension. It may be possible to use air temperature, a variable easier to measure than wire temperature, as a surrogate for wire temperature. However, to do this, one would have to consider the influence of the foliage shading the wire, which varies through the season.

At each row end, the magnitude of wire tension varied tremendously during the season, evident in the intercept values of the tension-temperature relationships at different phenological stages. In some rows with a full crop load, wire tension approximately doubled between bloom and harvest. For any given row the slopes of the tension-temperature relationship estimated at different dates were significantly different in a test for heterogeneity of slope. However, these differences between slopes were small and the expected tensions computed from date-specific slopes differed on average by only 1.2% (range 0 to 5.6%) from the tensions computed using the average of five slopes computed across the season. Thus, we used the averaged slope for each load cell installation to correct tension for diurnal temperature effects.

Figure 7:
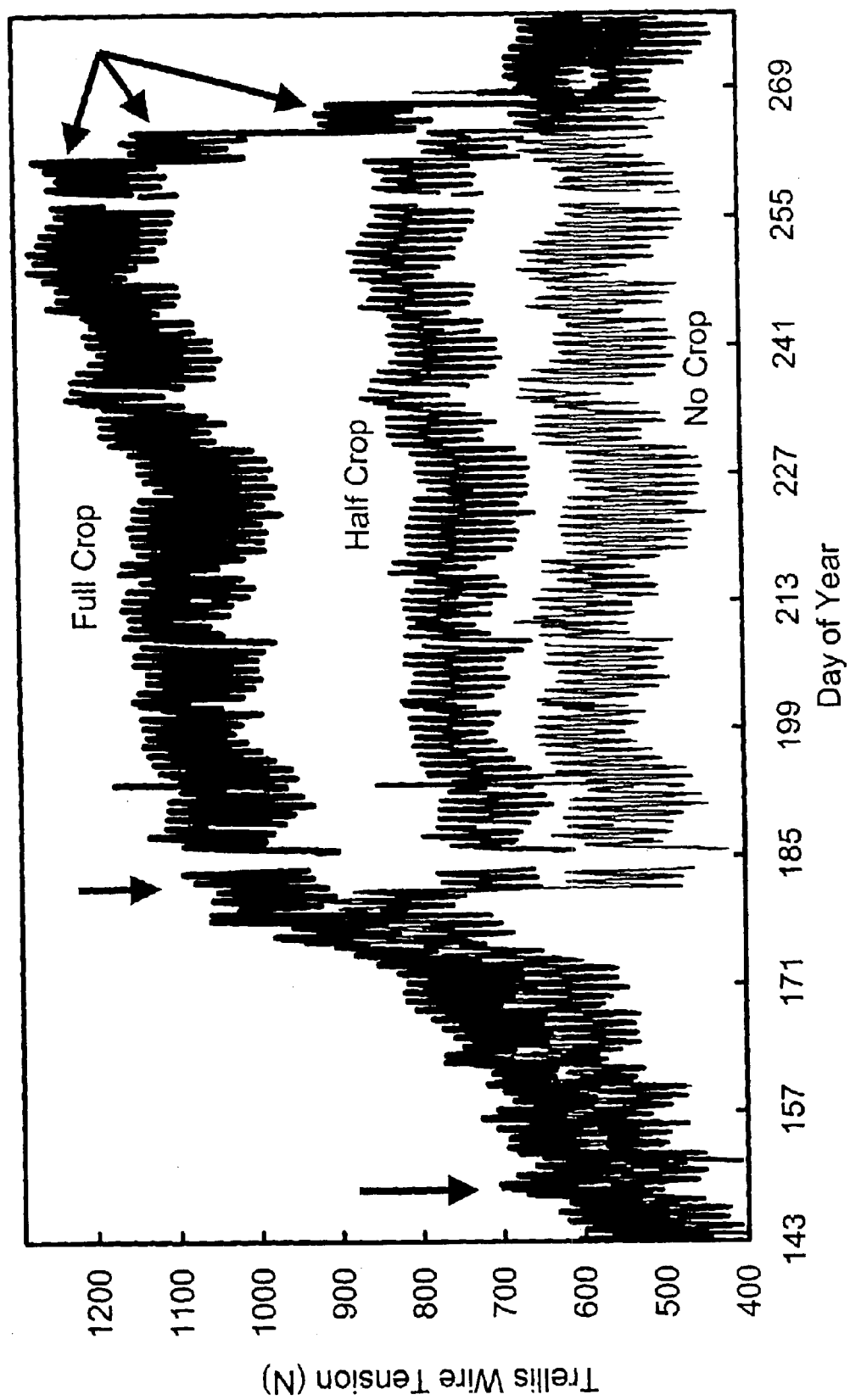
FIG. 7 is a chart showing the raw (uncorrected) measurements of tension in the cordon wire during the growing season, from DOY (day of year) 143 to 276, for (top to bottom) full-cropped vines, vines from which one half of all clusters had been removed (Half Crop), and vines from which all fruit had been removed (No Crop). Left to right, arrows indicate full bloom (DOY 148); the date the fruit was removed from Half Crop and No Crop vines (DOY 181); and the three harvest dates (DOY 261, 264, 267), where ⅓ of the fruit was removed from each row on each day.
Figure 8:
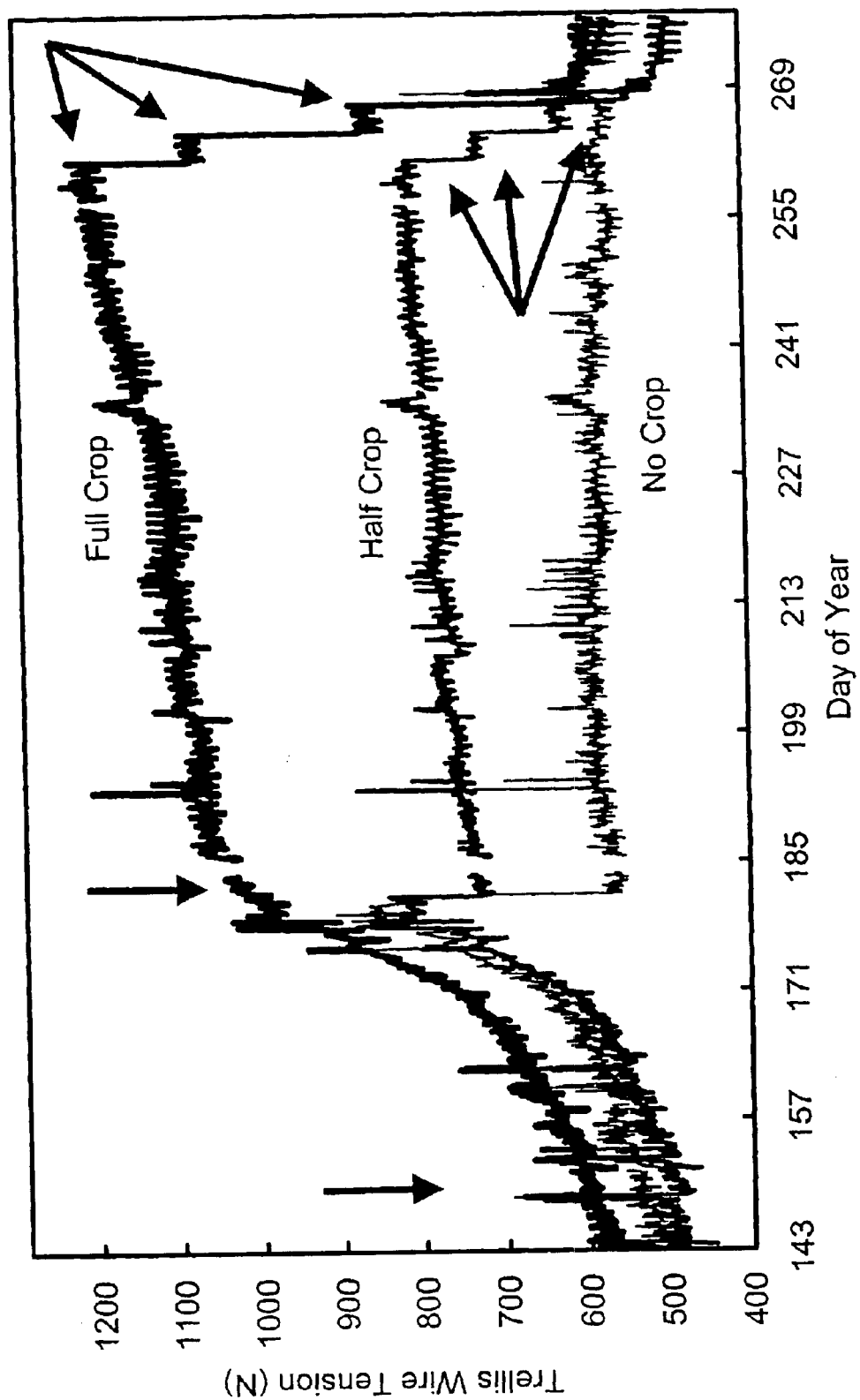
FIG. 8 is a chart showing the tension measurements for the growing season (DOY 143 to 276) after being corrected for effects of diurnal temperature cycling. Left to right, arrows indicate full bloom (DOY 148); the date the fruit was removed from Half Crop and No Crop vines (DOY 181); and the three harvest dates (DOY 261, 264, 267), where ⅓ of the fruit was removed from each row on each day.
Figure 9:
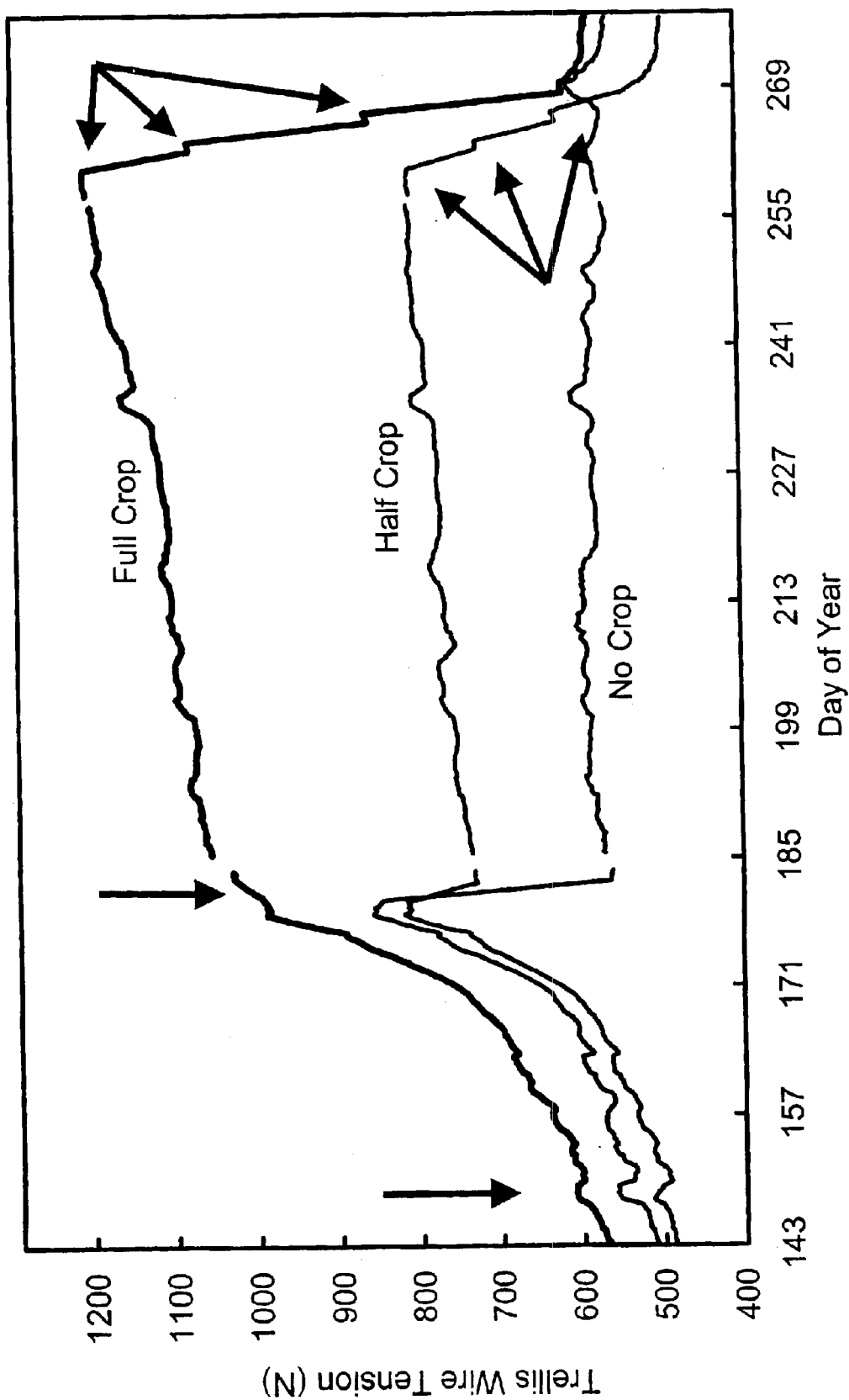
FIG. 9 is a chart showing the tension measurements for the growing season (DOY 143 to 276) after remaining short-term oscillations in the temperature-corrected data were smoothed by 48-h averaging with a floating window centered on the estimated value. Left to right, arrows indicate full bloom (DOY 148); the date the fruit was removed from Half Crop and No Crop vines (DOY 181); and the three harvest dates (DOY 261, 264, 267), where ⅓ of the fruit was removed from each row on each day.

Smoothing Temperature-Corrected Tension. Correction for the effects of diurnal temperature cycling removed much of the short-term noise in the wire tension measurements (FIG. 7,8). The seasonal trend in wire tension can be smoothed further by estimating each 15-minute average value with a moving 48-h window, using neighborhood values 24 h to either side of the point (FIG. 8, 9). At all three steps of data processing, major events remain evident with the accumulation or loss of tension in the trellis wire. For example, between DOY 148 and ~DOY 185 a rapid increase in shoot length is apparent. At DOY 181 the NC and HC treatments were applied, and these easily are seen by corresponding proportional drops in wire tension. Though final smoothing of the data could obscure short-term events, small plateaus marking harvest (DOY 261, 264, 267; ~3 h duration each day) persist in the tension curves (FIG. 9).

Effects of Wind. There was no apparent relationship between wind speed and wire tension (data not shown). Fifteen-minute integration of 5-s measurements from the load cell appeared to remove the effects of wind gusts on the signal. To minimize wind-related errors, tension measurements should be averaged for at least several minutes.

Figure 10:
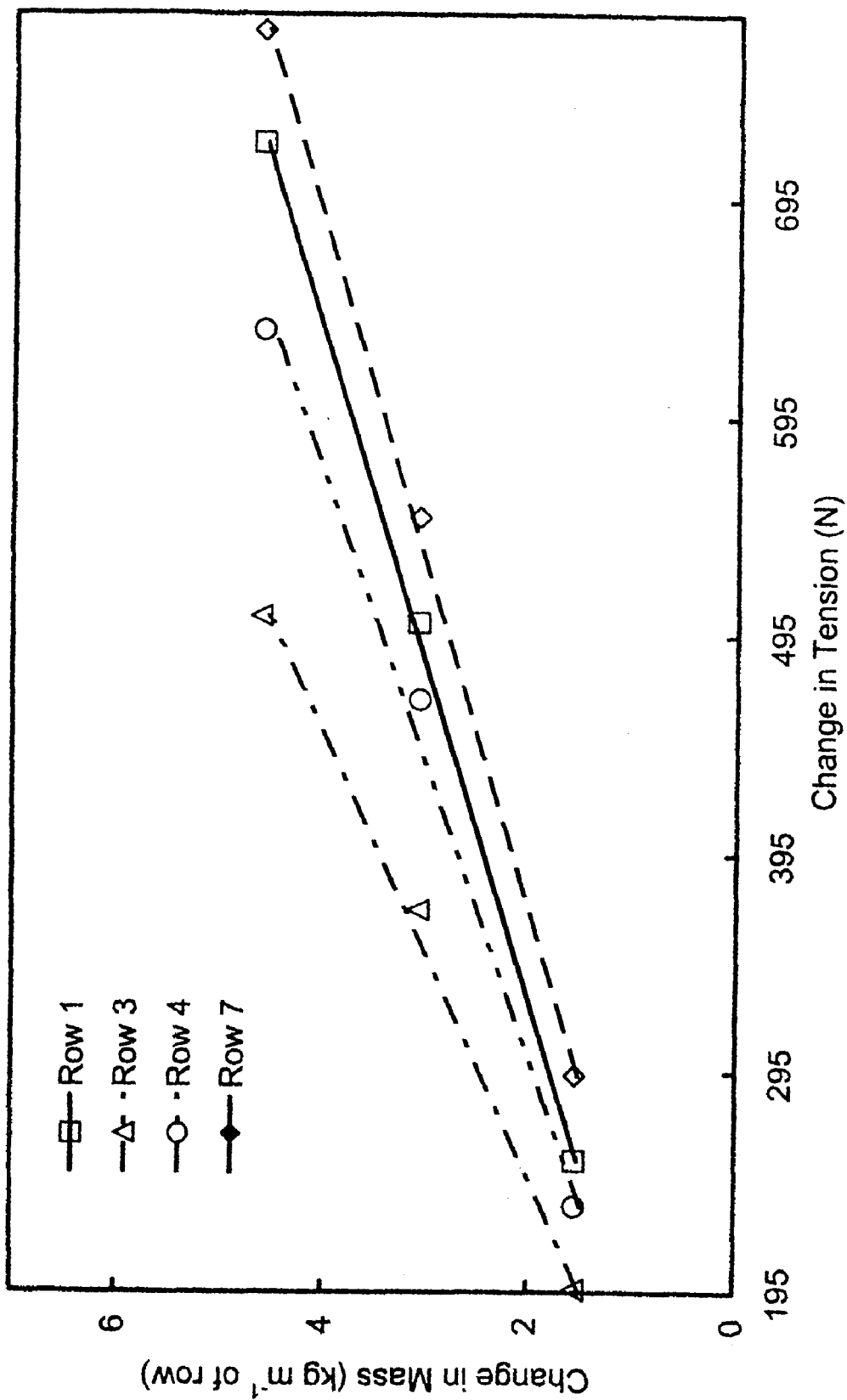
FIG. 10 is a chart showing the accumulated change in mass, using known weight hung along the cordon wire, as a function of accumulated change in tension of the trellis wire, for a subset of the experimental rows. Lines were predicted by linear regression. Differences among slopes were significant on this date.

Response of Tension to Known Mass. The response of the system to known mass was linear, although a 1:1 relationship between mass and tension was not expected because the mass was partially supported by posts and trunks. As might be expected because of structural differences between vineyard rows (e.g., posts, vine differences in attachment to the trellis wire), on some dates during the season there were significant differences between rows in the linear relationship between the cumulative increase in wire tension and the cumulative increase in known mass (See Table 1 below, and FIG. 10). In a commercial vineyard, one should anticipate independently calibrating each row that is equipped with a load cell. Thus the load cells apparently provided a real time record of crop and vegetative mass because a row's response to known mass did not shift during the season. Within a row end, on only two occasions were there potentially significant differences between slopes (See Table 2 below). On these two dates statistical significance should be interpreted cautiously because of the small number of observations. Data within each row end were pooled across the season and a single linear relationship was developed between accumulated mass and accumulated wire tension for each row end. In practice, calibration with known mass on a single date should suffice to predict the mass:tension relationship for the entire growing season, with one caveat: for a measurement near an end post, one must be certain that the post does not move during the season, which would change q and the sensitivity of the system. (FIG. 5). In this vineyard, when data were pooled over all rows, slopes were similar for north and south ends of the trellis (data not shown). Differences in the intercepts between the ends of the vineyard reflect the differences in initial wire tensions.

TABLE 1

General Linear Model for the interaction between cumulative change in tension (newtons) with known mass and row within the (N)orth or (S)outh end of the vineyard and day of year. A significant interaction indicates the presence of different slopes.

| Row End | DOY | d.f. | SS | F | Pr > F |
|---|---|---|---|---|---|
| N | 139 | 7 | 0.18836 | 1.5197 | 0.28428 |
| N | 187 | 8 | 0.55175 | 16.8222 | 0.00015* |
| N | 208 | 7 | 0.60306 | 1.9787 | 0.17963 |
| N | 236 | 8 | 1.23552 | 6.7488 | 0.00486* |
| N | 256 | 8 | 0.87836 | 3.2238 | 0.05025+ |
| S | 139 | 7 | 0.82190 | 16.0426 | 0.00040* |
| S | 187 | 8 | 0.88938 | 2.1111 | 0.14336 |
| S | 208 | 8 | 1.24829 | 1.2763 | 0.35986 |
| S | 236 | 8 | 1.31278 | 1.6607 | 0.23261 |
| S | 256 | 8 | 1.89487 | 3.2158 | 0.05059+ |

+significance questionable in the context of small number of observations
*considered significant

TABLE 2

General Linear Model for the interaction between cumulative change in tension (newtons) with known mass and DOY within the (N)orth or (S)outh end of each row of the vineyard. A significant interaction indicates the presence of different slopes by date.

| Row End | Row | d.f. | SS | F | Pr > F |
|---|---|---|---|---|---|
| N | 1 | 4 | 0.03958 | 1.81431 | 0.26359 |
| N | 2 | 3 | 0.14869 | 8.07512 | 0.03583* |
| N | 3 | 4 | 0.21638 | 2.98358 | 0.13083 |
| N | 4 | 4 | 0.48394 | 3.61005 | 0.09585 |
| N | 5 | 4 | 0.51578 | 9.17745 | 0.01592* |
| N | 6 | 4 | 0.74883 | 2.09397 | 0.21917 |
| N | 7 | 4 | 0.19332 | 3.80943 | 0.08745 |
| N | 8 | 4 | 0.21289 | 2.44498 | 0.17668 |
| N | 9 | 3 | 0.07061 | 2.36861 | 0.21171 |
| S | 1 | 4 | 0.33565 | 2.80650 | 0.14388 |
| S | 2 | 4 | 0.05529 | 0.14387 | 0.95811 |
| S | 3 | 4 | 0.46313 | 1.36938 | 0.36293 |
| S | 4 | 4 | 0.14915 | 2.83901 | 0.14135 |
| S | 5 | 4 | 0.22371 | 0.79487 | 0.57606 |
| S | 6 | 4 | 0.40112 | 0.59297 | 0.68360 |
| S | 7 | 4 | 0.17975 | 1.69282 | 0.28669 |
| S | 8 | 4 | 0.25595 | 3.02230 | 0.12820 |
| S | 9 | 3 | 0.18035 | 0.38123 | 0.77285 |

*significance questionable in the context of small number of observations

The row ends that had been set with higher initial tension (about 1000 N, north) had greater sensitivity (21.2%) to an increase in mass than those set at a lower initial tension (about 500 N, south) as would be expected. In a commercial vineyard, it would simplify the system to set a uniform initial tension in all sample rows, selecting that tension to optimize sensitivity. After harvest, wire tension returned to nearly the value recorded before fruit set in FC and HC rows (FIG. 9), and to that recorded after the removal of all clusters in the NC rows. This return to initial values suggests that the system did not store energy and that there was little detectable growth in vegetation after DOY 182.

Figure 11:
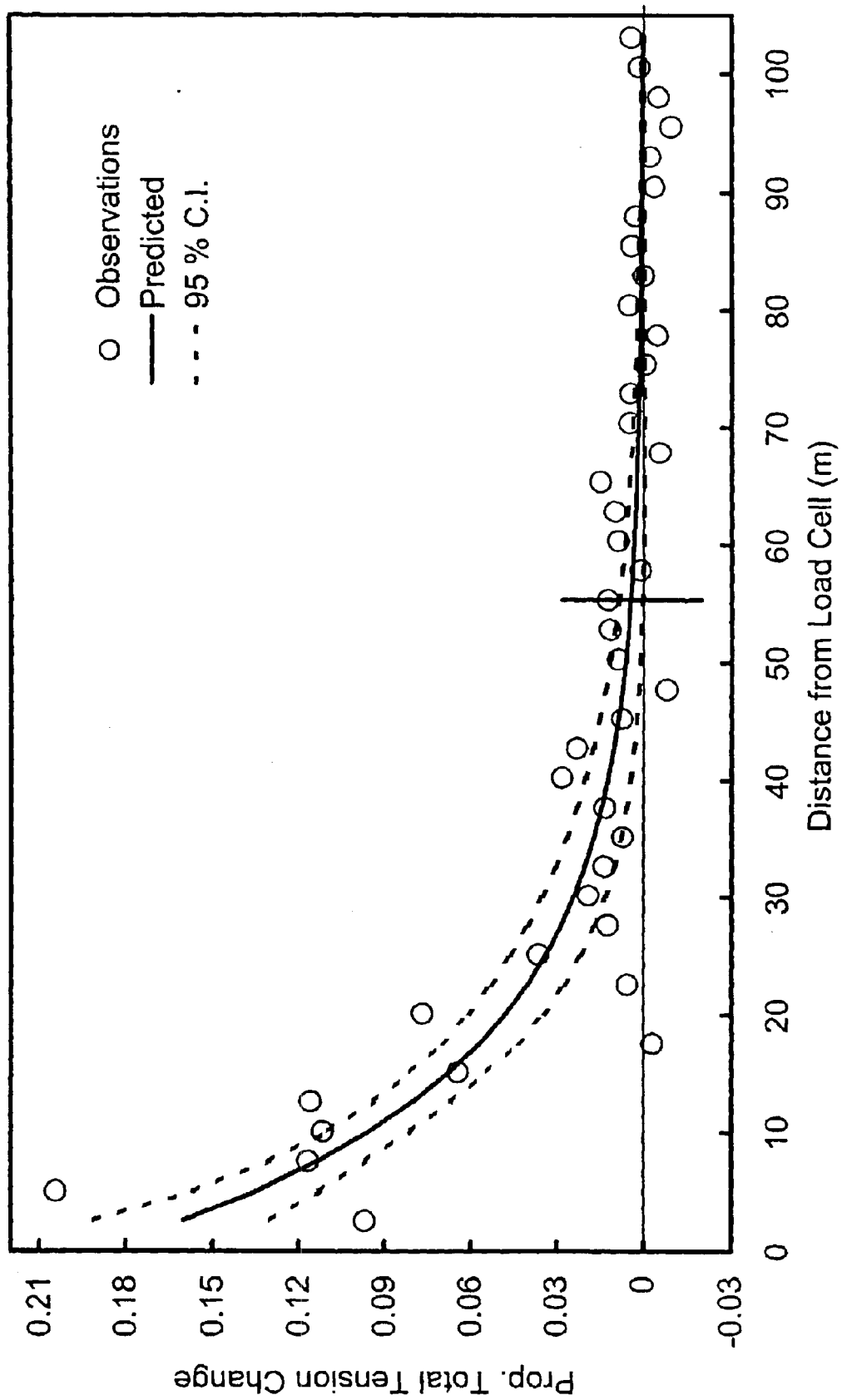
FIG. 11 is a chart showing the proportion of the total change in tension as a function of distance from the load cell, modeled as an exponential decay. Vertical bar indicates distance where the lower 95% confidence limit crosses zero.

Effect of Distance from Load Cell. To some extent, the trellis structure and the vines attenuate the transfer of added tension to the load cell. This relationship was modeled as an exponential decay and varied substantially from row to row (FIG. 11). Taking the intersection of the lower 95% confidence limit for each row as a measure of the effective distance, on average an increase in mass was undetected at ~55 m from the load cell (n=18, SE=4.7, Range 26.2–82.9). Consistent with the difference in sensitivity between the row ends, a change in mass was detectable at a greater distance from the load cell at the north end (mean=69.8 m, n=9, SE=4.6, Range 43.3–82.9) than from the load cell at the south end (mean=39.8 m, n=9, SE=3.9, Range 26.2–59.1). In practical terms, a tension measurement will be dominated by the fruit hanging nearest the load cell. The end post may not be the best location for a load cell if one wishes to maximize the length of the sampling unit per instrument. Placing the load cell in the middle of a row could increase the length of the sampling unit by allowing tension to be detected on both sides of the sensor. In addition, vines at the ends of rows likely represent an "edge effect" and may not correspond to the mean overall yield of an individual row or of the vineyard. In vineyards where cordon wires are firmly stapled or clipped to intermediate posts, one might expect the sensitivity of the measurement to decline more rapidly away from the load cell than in this experiment where we replaced all staples with pulleys. Vineyards in which cordons have not grown around the wire could improve the transmission of tension along the wire.

Not all tension in a cordon wire is transmitted directly to the end post for several reasons: 1) the pulleys on intermediate posts do not transmit tension equally to either side of the pulley, 2) curved trunks pull the wire horizontally; 3) intermediate posts and vine trunks support some of the load on the wire; and 4) cordons that have grown around the wire limit lateral transmission of tensile force. In new vineyards, the sensitivity of a wire tension measurement could be increased by suspending cordons from the wire rather than wrapping them around the wire. The training practice of cane pruning, in which the horizontal vine structure is annually-renewed, two-year-old wood (cane) rather than a permanent woody cordon, may be a more appropriate system for estimating yields from wire tension because the cane is suspended from the horizontal trellis wire and bears less of the load than would a large cordon. The extent to which the trunk stores potential energy varies during the season as the trunk hydrates with irrigation and as it responds to increasing crop load. Some trellis systems, like Geneva Double Curtain, train the trunk at cordon height to a right angle perpendicular to the row. In this system, the vegetation and fruit hang like a curtain in a separate vertical plane parallel to the trunks and intermediate posts; tension may be transferred more effectively to a load cell at the end of a curtain wire than at the end of a single-wire trellis.

Figure 12:
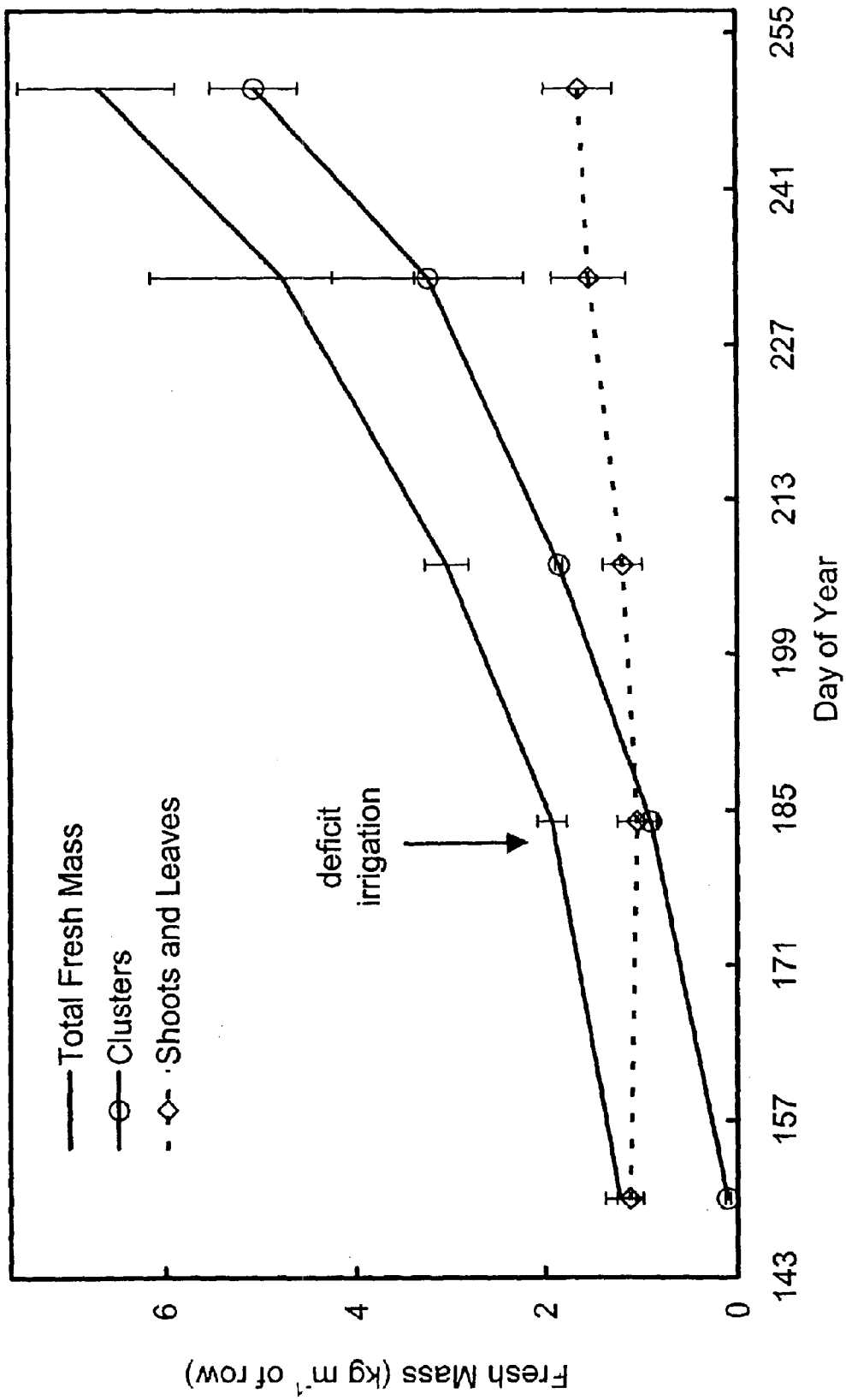
FIG. 12 is a chart reflecting the mean fresh mass of vines in the full crop treatment rows (SE, n=3). Deficit irrigation was initiated in July (DOY 182) to reduce the addition of vegetative mass during the period of fruit enlargement.

Seasonal Pattern of Fresh Mass. We deficit-irrigated the vineyard from the beginning of July (DOY 182), about 30 days after fruit set. Destructive sampling showed the success of the irrigation strategy as vines gained little vegetative mass after that time. (FIG. 12). Furthermore, for all rows with no fruit, tension in the cordon wire did not increase appreciably between the time of crop thinning and harvest (FIG. 9). On vines of the FC and HC rows, fruit was the primary component of fresh mass (kg $m^{-1}$ of row) at harvest, comprising 75 and 61% of the total, respectively. Similar proportions have been observed for above-ground dry matter on potted vines that had been thinned to various crop levels. The ratio of fruit to vegetative mass varied tremendously through the season in the FC and HC rows because the deficit irrigation approach so limited vegetative growth.

One considerable difficulty in applying a measure of tension in the cordon wire to an estimate of crop yield lies in accounting for the vine's vegetative mass. In vines that are well-watered, such as the 'Concord' juice grape or the 'Thompson Seedless' table grape, shoots elongate and add leaves during nearly the entire growing season. Thus, while the fruit gains mass so does the vine canopy, and both contribute to the tension in the cordon wire. Vegetative growth will vary by season as does fruit growth. One approach with the load cells may be to collect several years' data on canopy growth to determine whether a given vineyard block is managed well enough to produce consistently sized vine canopies from year to year, and to model that growth according to heat accumulation, or "growing degree days" to normalize for seasonal weather variation. In that case, the canopy's contribution to the total tension in the cordon wire may be considered a constant factor. In deficit-irrigated vineyards, shoot length is controlled by application of water to minimize vegetative growth soon after fruit set. In this situation, vegetative mass changes little during the period of fruit growth, making increases in wire tension between fruit set and harvest easier to interpret. Estimating yield from trellis wire tension may be most readily applicable to deficit-irrigated vineyards and in other trellised crops where vegetative growth naturally slows or stops during the period of fruit development.

Figure 13:
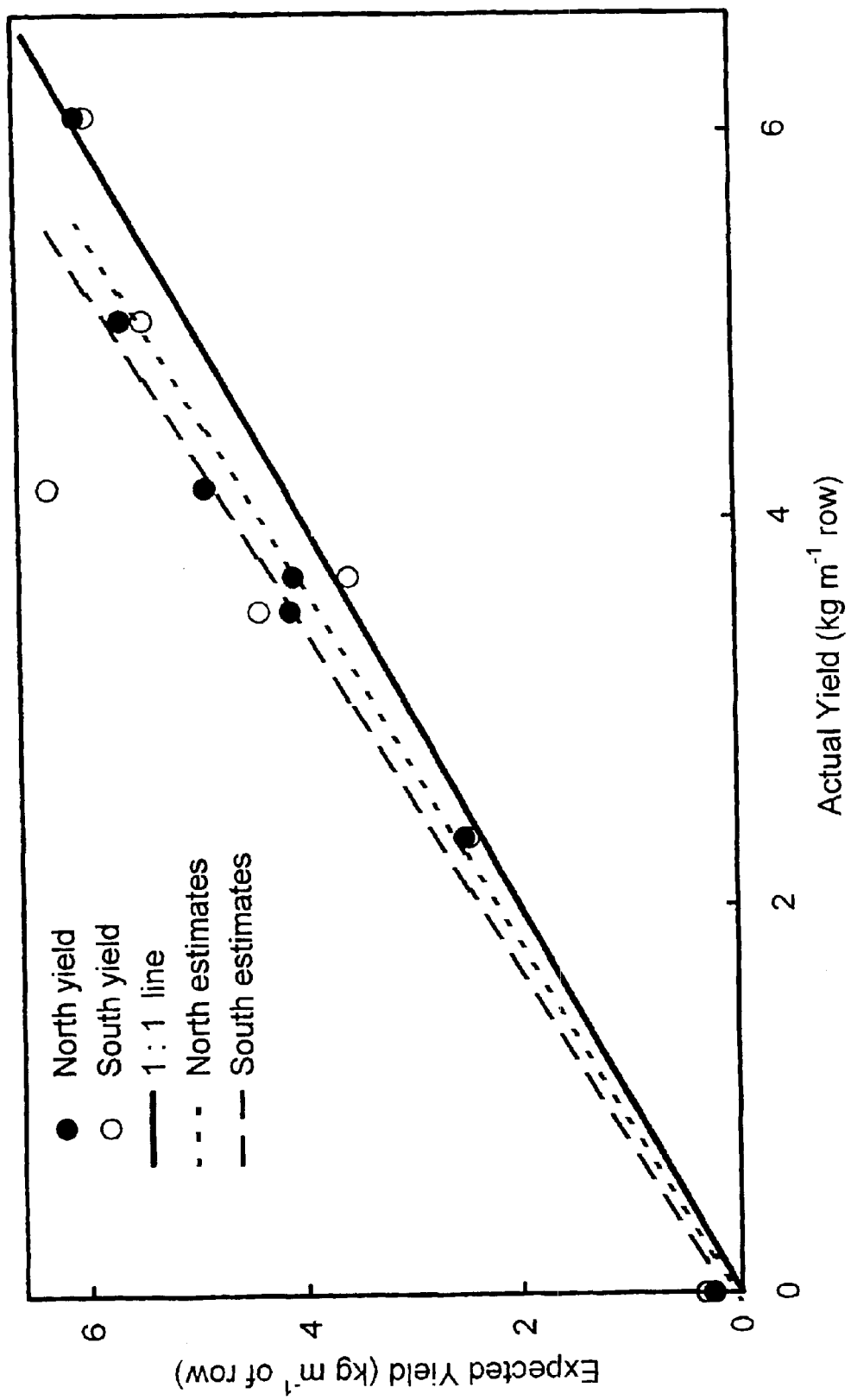
FIG. 13 is a chart showing the expected yield estimated from wire tension just prior to harvest and actual yield.

Relationship of Increase in Tension to Yield. The mean yield for FC rows was 5.09 kg $m^{-1}$ of row (±0.555 SE), and 3.19 kg $m^{-1}$ of row (±0.423 SE) for HC. This corresponded to low-to-average yields for 'Concord' in Washington (equal to industry average for 2001) and for the HC rows, low yields. However, the HC row yields were representative of those in premium wine grapes. Yield was presumed to be 0 for the NC treatment. Over the 2001 season tension increased an average of 899 N (range 625 to 1995 N) on the north row ends, and 634 N (range 405 to 1039 N) on the south ends. There was a strong linear relationship between final yield and the change in tension in the cordon wire throughout the season. The slope of this relationship did change during the season because progressively larger changes in tension due to crop growth were regressed against the final yield. At harvest, measured yields were lower than those that would have been predicted by the known mass calibrations. (FIG. 13). Full Crop rows were overestimated by an average of 14.5±8.1% and HC rows by 10.1±4.1%. Also, there was a difference in spatial scale. Vines nearest the load cell received higher weighting in the tension-based estimate, whereas harvest data represent yield averaged over the entire row.

In an alternative embodiment, we adjusted the yield estimate by attempting to remove the vegetation's contribution to the increase in % ire tension. A major limitation to this process was the limited number of plants available for destructive sampling, due to the nature of research on perennial crops. An ideal solution would be the identification or development of a satisfactory non-destructive estimator of vegetative mass, like shoot length or an optical sensor that could estimate canopy size and mass, so that one could account for the proportion of mass due to vegetation. The relationship between shoot length and mass will vary with internode length and specific leaf area, which may be cultivar- and season-specific. Until such methods are resolved, non-destructive series of measurements such as shoot length and shoot number could be recorded over several seasons to establish the consistency of the vegetation's contribution to the tension measurement during fruit growth.

With further refinements, a measurement of tension in the horizontal support wire of a trellis should provide an accurate estimate of fruit mass throughout the season and a method of predicting final yield. A strong linear relationship was demonstrated between yield and the change in tension from the season's start. By correcting to a standard temperature and using a 48-h moving average, the influence of wire temperature on the tension can be eliminated. Our observations also suggest that the measurements are robust against wind.

Loading trellis wires with known mass showed that the relationship between an increase in mass and an increase in tension did not vary significantly, nor in any consistent pattern, as the overall tension increased with growth during the season. While there is relative consistency within the system through the season, there were significant differences among vineyard rows in the relationship between change in wire tension and change in known mass. This relationship helps to normalize mass estimates from the rows, thus letting one account for row-to-row variability. Sensitivity, a function of the initial tension, decreased with distance between the load and the load cell. There was a large amount of variability between row ends in the rate of decay for load cell sensitivity and the distance to which a change in mass might be sensed.

The ability to isolate fruit mass from vegetative mass at any moment during the growing season is needed to apply this methodology to the estimation of fruit mass and yield predictions. An estimate of fruit mass should be simply a matter of reducing the total mass estimate (based on increase in wire tension) by the proportion contributed through vegetative growth. Estimates of yield using the relationship of change in tension to increase in known mass were, as expected, greater than the actual harvested mass, but when the mass contribution from vegetation was removed, yield predictions were reduced below the observed values. Our attempt to account for the vegetative component at harvest proved inadequate, largely due to small sample sizes dictated by the size of the experimental vineyard and the perennial nature of the crop.

If growers rely on such vegetative sampling little advantage will be gained over the current labor-intensive practices. An alternative to sampling might include coupling mass estimates made from trellis wire tensions to fruit-vegetation ratios predicted from growth models. A corollary would be for growers to use or develop historical records relating season-long tension estimates to fruit mass, especially for harvest prediction. This latter possibility would be very similar to the current practice of extrapolating from a few berry samples during the growing season, but would be vastly improved by the contribution of continuous tension estimates.

For general applicability to growers, future work needs to explore several issues, especially whether the relationships between increasing wire tension and mass (yield) are consistent by season, across vineyards, and among trellis types. If the method is to be used for making early-season predictions of yield, then growth models or non-destructive, inexpensive means are needed to partition the increased mass between fruit and vegetative growth. For a commercial vineyard, one must determine the number of required sensors and their optimal spatial deployment. As the number of sensors per vineyard increases, the cost per sensor and data acquisition system must decrease if the method is to be adopted.

The present invention has been shown in the described embodiments for illustrative proposes only. The present invention may be subject to many modifications and changes without departing from the spirit or essential characteristics thereof. We therefore claim as our invention all such modifications as come within the spirit and scope of the following claims.

We claim:

1. A method for measuring the mass of plant structures supported on a support wire of a trellis structure, the method comprising:

measuring the support wire tension created by the supported plant mass; and translating the tension of the support wire into the mass of the plant structures supported on the support wire.

2. The method of claim 1, wherein the tension of the support wire is measured with at least one load cell placed in-line with the support wire.

3. The method of claim 2, wherein translating the tension of the support wire into the mass of the plant structures supported on the support wire includes correcting the tension of the support wire to account for environmentally-induced thermal expansion and contraction of the support wire.

4. The method of claim 1, wherein the plant structures include a harvestable crop and the method further comprises determining the mass of the harvestable crop from the tension of the support wire.

5. The method of claim 1, wherein:

the plant structures include fruit and vegetation; and the method further comprises determining the mass of fruit supported on the support wire.

6. The method of claim 1, further comprising estimating the crop yield at harvest from the tension of the support wire.

7. A method for measuring the mass of plant structures supported on a trellis structure, the method comprising:

connecting a tension-measuring device to the trellis structure such that the tension measuring device is operable to measure the tension of a wire of the trellis structure;

measuring the tension of the wire; and determining the mass of the plant structures from the tension of the wire.

8. The method of claim 7, further comprising connecting a tension adjuster to the wire for increasing or decreasing the tension of the wire.

9. The method of claim 7, further comprising measuring the temperature of the wire and correcting the tension to account for thermal expansion or contraction of the wire.

10. The method of claim 7, wherein:

the plant structures comprise vegetation and a crop; and the method further comprises determining the mass of the crop supported on the trellis structure from the tension of the wire.

11. A method for measuring the load induced on a trellis structure by plant structures, comprising the steps of:

(a) measuring the tension in a support wire of the trellis structure; and (b) translating said tension in the support wire into the mass of the plant structures.

12. The method of claim 11, wherein the tension in the support wire is measured with a load cell.

13. The method of claim 11, further comprising estimating the crop yield of the plant structures at harvest from the load induced on the trellis structure.

14. A system for measuring the mass of living plant structures supported on a trellis structure comprising:

a tension-measuring device adapted for coupling to a wire of the trellis structure, the tension-measuring device being operable to measure the tension of the wire and to generate a signal corresponding to the tension of the wire; and a controller operatively connected to the tension-measuring device, the controller being operable to receive the signal from the tension-measuring device and to automatically translate the tension into the mass of the plant structures.

15. The apparatus of claim 14, wherein the tension-measuring device comprises a load cell.

16. The apparatus of claim 14, wherein the tension-measuring device comprises a strain gauge.

17. The apparatus of claim 14, further comprising a tension adjuster adapted to be coupled to the wire for adjusting the tension of the wire.

18. A trellis apparatus for supporting plant structures, comprising:

first and second end posts;

one or more intermediate posts positioned between the end posts, each intermediate post having a pulley;

a support wire extending between the end posts and supported on the pulleys of the intermediate posts;

means to measure support wire tension created by plant structures; and means for converting said tension measurements into information useful for predicting yield.

19. The trellis apparatus of claim 18, wherein said means to measure tension in said support wire is a load cell.

20. The trellis apparatus of claim 19, further comprising a tension adjuster coupled to the support wire and adapted to increase and decrease the tension of the support wire.

* * * * *